United States Patent [19]

Bonga

[11] 4,420,671
[45] Dec. 13, 1983

[54] HELICOIDAL GUIDE FOR WIRE ELECTRODE OF AN EDM APPARATUS

[75] Inventor: Benno I. Bonga, Crans, Switzerland

[73] Assignee: Ateliers des Charmilles S.A., Geneva, Switzerland

[21] Appl. No.: 302,061

[22] Filed: Sep. 14, 1981

[51] Int. Cl.³ .............................................. B23P 1/08
[52] U.S. Cl. ............................................... 219/69 W
[58] Field of Search ................ 219/69 R, 69 W, 69 E, 219/69 G

[56] References Cited

U.S. PATENT DOCUMENTS

| | | | |
|---|---|---|---|
| 3,946,189 | 3/1976 | Pomella et al. | 219/69 E |
| 4,029,929 | 6/1977 | Rietveld | 219/69 W |
| 4,243,864 | 6/1981 | Vieau et al. | 219/69 W |
| 4,363,949 | 12/1982 | Pfau et al. | 219/69 W |

Primary Examiner—B. A. Reynolds
Assistant Examiner—M. M. Lateef
Attorney, Agent, or Firm—Hauke and Patalidis

[57] ABSTRACT

An adjustable and controllable electrode wire support and guide mechanism for traveling wire EDM apparatus wherein an electrode wire, longitudinally fed, is stretched between a pair of support and guide members, and wherein at least one of the support and guide members is in the form of a helically grooved cylindrical member directly driven by a servo-motor. The helical groove defines guiding surfaces for the electrode wire which is in engagement with opposite sidewalls of the groove and, by rotating the helically grooved support and guide member by the servo-motor, the electrode wire is caused to take a predetermined inclination relative to the workpiece. The invention permits to reduce the number of moving parts required for inclining an electrode wire to two elements only which provide a precise guiding for the electrode wire, which considerably reduce play, backlash and other errors due to geometric imperfections of the conventional slides and cross-slides normally used for varying the inclination of wire electrodes in traveling wire EDM apparatus.

13 Claims, 6 Drawing Figures

HELICOIDAL GUIDE FOR WIRE ELECTRODE OF AN EDM APPARATUS

BACKGROUND OF THE INVENTION

The present invention relates to a traveling wire EDM apparatus and more particularly to a novel electrode wire guide and support structure for a traveling wire EDM apparatus.

It is known that traveling wire EDM apparatus utilize an electrode tool in the form of a metallic wire held under traction between a pair of support and guide members. The wire is continuously fed, at relatively high rate, in a longitudinal direction such as to continuously present a fresh portion of the wire in the machining zone between the electrode wire and the workpiece. The EDM apparatus is provided with a pulse generator connected across the electrode wire and the workpiece, and with a numerical control commanding a pair of servo-motors, the X-axis and Y-axis servo-motors, for displacing the longitudinal axis of the electrode wire relative to the workpiece according to a pre-programmed path such as to cut the workpiece, according to a predetermined shape, by the electrical discharges occurring in the machining zone between the the electrode wire surface and the workpiece surface.

Conventionally, the workpiece is held along a horizontal plane and the electrode wire is held vertically by the support and guide members, one support and guide member being disposed above the workpiece and the other being disposed below the workpiece. Each of the support and guide members is mounted on the end of a support arm. In some cutting operations, it is desirable to incline the longitudinal axis of the electrode wire relative to the workpiece at an angle other than a right angle. In order to accomplish this, the usual arrangement consists in mounting the upper electrode wire support and guide member on an intermediary movable member, rather than directly on the support arm, such as to provide the upper support and guide member with a limited amount of travel along one horizontal axis, or along two perpendicular horizontal axes, such as to displace the upper support and guide member away from its support and guide member. The mechanism permitting to incline the electrode wire may consist of a small cross-slide table, generally referred to as a UV table, displacing the wire support and guide member according to Cartesian coordinates or of an eccentric, generally referred to an RΘ, displacing the support and guide member according to polar coordinates. If it is desired to incline the electrode wire, in the course of a machining operation, to any practical angle and orient the wire in any direction, two additional servo-motors are required, one for each axis when using a cross-slide table, the axes being referred to as the U-axis and the V-axis.

In application Ser. No. 208,934, filed Nov. 21, 1980 and assigned to the same assignee as the present application, a structure is disclosed which consists of a single slide mounted on the upper support arm, and a single slide mounted on the lower support arm, both slides being displaceable in a horizontal plane, one along an axis perpendicular to the axis of displacement of the other slide.

Slide mechanisms present an important inconvenience. They must have many moving parts in order to convert rotating motions into linear motions. For example, the leadscrew-nut assembly introduces a certain amount of play and backlash into the mechanism, and the slide provided with the nut for the leadscrew is supported from ways which introduce another amount of play and backlash. In arrangements consisting of a cross-slide table, the superimposition of the motions along the U-axis and the V-axis doubles the amount of play and backlash and, of course, additional errors must be added, such errors resulting from the machining tolerances and the geometric imperfections of the bearing surfaces.

Attempts have been made at reducing such cumulative errors by eliminating the slide. For example, one proposed solution, as disclosed in published German patent application No. 2401424, consists in mounting the workpiece by way of universal joint, such as to be able to incline the wire in any direction relative to the workpiece. In published German patent No. 2644369, it is the whole support arm assembly which is made pivotable in all directions by means of bearing surfaces disposed on cylindrical surfaces. Such solutions eliminate therefore any linear motion, but they present the disadvantage of requiring a mechanism somewhat rigid and powerful for the electrode wire guide and support member in order to pivot with precision a heavy and cumbersome assembly. In addition, in heavy EDM apparatus, the present state of the art requires a gear reduction mechanism to be incorporated in the system between the servo-motors and the heavy movable assembly, which, in turn, requires a chain of moving parts which reintroduce all the play and backlash which were sought to be eliminated in the first place.

SUMMARY OF THE INVENTION

The present invention has for a principal object to provide a mechanism for supporting, guiding and inclining the electrode wire of a traveling wire EDM apparatus, which utilizes a minimum of moving parts, insures high precision in the guiding of the electrode wire, and results in positively reducing any risk of parasitical play and other errors of geometry. The invention permits to eliminate slides, without calling upon the hereinbefore-mentioned solutions to the problem which consist of heavy and cumbersome mechanisms.

The invention provides a mechanism wherein at least one of the support and guide members of the wire electrode of an EDM apparatus comprises a rotatable member driven by a motor and provided with a helical groove whose surfaces act as guiding surfaces for the electrode wire. Preferably, the rotatable member is generally cylindrical in shape, and has a helical V-groove of constant lead. The member is made of very hard material, wear-resistant, and in which the helical V-groove can be cut and its surfaces polished. For example, the support and guide member is made of sapphire.

The invention presents the advantage of directly converting the rotation of the output shaft of a servo-motor into a linear displacement of the contact surfaces against which the wire is caused to engage. There is only one moving part, namely the rotor of the servo-motor which is directly coupled to the helical or screw-thread support and guide member according to the invention. This results in a maximum reduction of the number of moving parts, which, in turn, eliminates adding up errors. The novel structure of the invention, therefore, results in obtaining high precision at very little cost.

In addition the invention permits to preserve the particular advantages provided by the positioning system utilizing Cartesian coordinates, which avoids the particular complication of systems utilizing polar coordinates resulting from the polar coordinates being determined relative to a reference point. The arrangement of the invention facilitates the original setup of the workpiece, such setup consisting simply in positioning the electrode wire perpendicular to the table supporting the workpiece.

BRIEF DESCRIPTION OF THE DRAWINGS

A better understanding of the invention will be had by those skilled in the art when the following description of the best modes contemplated for practicing the invention is read in conjunction with the accompanying drawings, wherein like reference numerals refer to like parts, and in which.

DETAILED DESCRIPTION OF THE PREFERRED EMBODIMENTS

Figure 1:
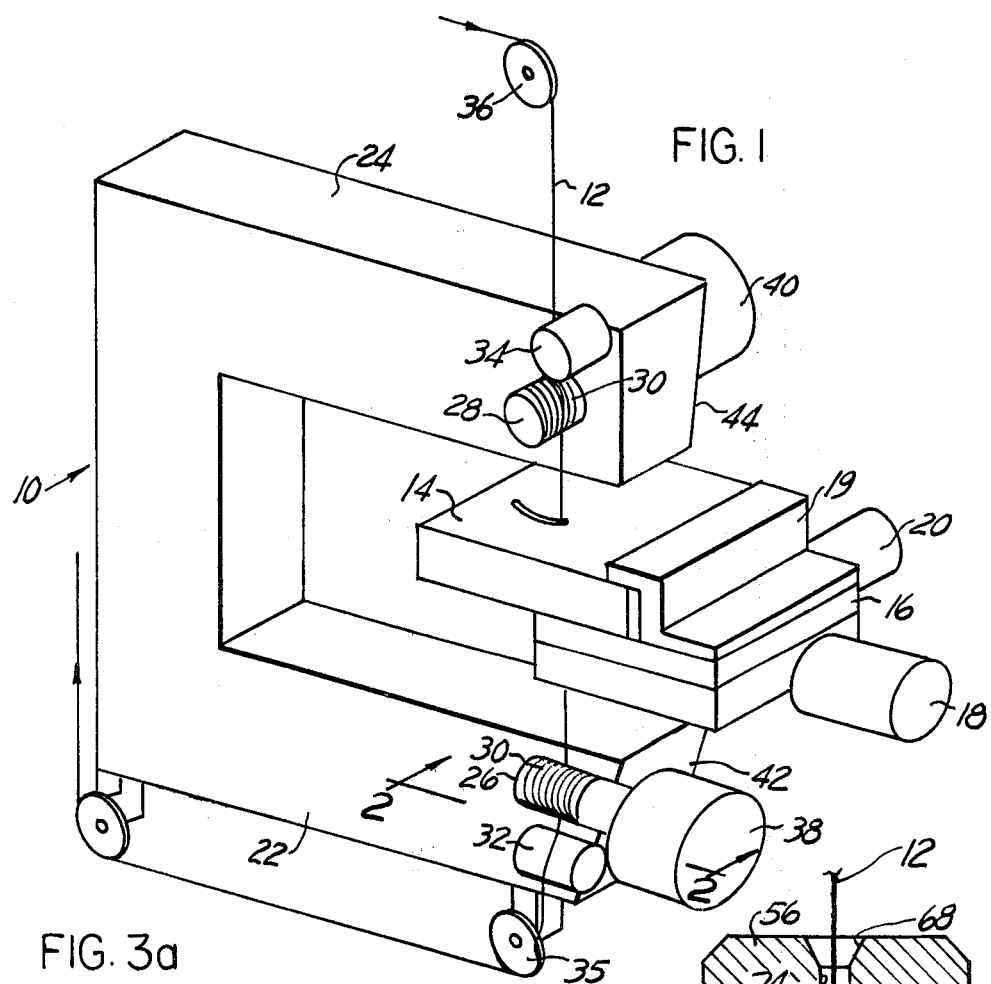
FIG. 1 is a schematic illustration of a traveling wire EDM apparatus provided with an example of electrode wire support and guide mechanism according to the present invention, whose control is effected according to Cartesian coordinates.

Referring now to the drawings and more particularly to FIG. 1, there is schematically illustrated a traveling wire EDM apparatus 10 provided with an electrode wire 12 effecting a cut in a workpiece 14. Diverse components of the EDM apparatus, well known in the art and forming no part of the present invention, are not illustrated, such as a tank filled with a dielectric liquid in which the workpiece 14 is immersed, a voltage pulse generator connected across the electrode wire 12 and the workpiece 14 for causing electroerosive electrical discharges across the gap in the machining zone between the electrode wire 12 and the workpiece 14, and a numerical control with appropriate connections to the diverse servo-motors, for example. The workpiece 14 is mounted, in a cantilever fashion, on a table 16 by way of a clamp 19 or any other appropriate fastening means. The table 16 is provided with cross-slides permitting the table to be displaced by a servo-motor 18 along an X-axis and by a servo-motor 20 along a Y-axis perpendicular to the X-axis. Other arrangements for the relative displacement between the electrode wire 12 and the workpiece 14 are conventionally used, for example the table 16 may be displaced along the X-axis only, while the electrode wire 12 is displaced along the Y-axis as a result of displacing along the Y-axis a pair of support arms 22 and 24 for the electrode wire 12.

The electrode wire 12 is stretched between a pair of helically grooved support and guide members 26 and 28 according to the present invention. The helically grooved support and guide member 26 is mounted on the end of the support arm 22, below the workpiece 14, and the helically grooved member 28 is mounted on the end of the support arm 24 above the workpiece 14. The helically grooved support and guide members 26 and 28 are made preferably of a cylindrical body of very hard material, wear-resistant, in which a helical groove or screw-thread 30 may be cut with wall surfaces provided with a highly polished surface finish. The material is preferably sapphire or ceramic, and the helical groove or screw-thread 30 is preferably a helical V groove of constant lead.

A pair of contact members, respectively shown at 32 and 34, have each the double function of supplying electrical current to the electrode wire 12 and to urge the electrode wire 12 to the bottom of a portion of the helical V-groove 30. The electrode wire 12 is obtained from a supply spool, not shown, and winds around a pair of pulleys 35 and 36, one disposed below the workplace 14 and beyond the assembly consisting of the lower electrode wire support and guide member 26 and of the lower contact member 32, and the other disposed above the workpiece 14 and above the upper support and guide member 28 and contact 34. Appropriate power means, not shown, are used to feed the wire 12 and displace it longitudinally in the direction of the arrows.

At FIG. 1, the structure of the contact members 32 and 34 has been shown extremely simplified, as being in the form of simple stationary cylinders. As will be hereinafter explained in detail, such a simple structure would not be practical as stationary contact members would be subject to rapid wear.

The support and guide member 26 is driven in rotation by a servo-motor 38 and the support and guide member 28 is driven in rotation, in a similar manner, by a servo-motor 40. Preferably, the servo-motors 38 and 40 are stepping motors or high torque d-c motors, such that the support and guide members 26 and 28 may be coupled directly to the output shaft of the motors. When the servo-motor 38, for example, is energized, the electrode wire 12 engaged in a portion of the bottom of the helical V groove 30 is displaced along a substantially straight direction parallel to the longitudinal axis of the rotating support and guide member 26, in the same manner as it would be displaced as a result of displacing a conventional electrode wire support and guide member, with the result that the electrode wire 12 becomes inclined in that direction. Because the longitudinal axis of the helically-grooved support and guide member 28 is substantially perpendicular to the longitudinal axis of the helically-grooved support and guide member 26, the electrode wire 12 can be inclined in any desired direction. If the cutting path through the workpiece 14 is defined, for example, relative to the plane formed by the upper face of the workpiece, any inclination of the electrode wire 12 causes an offset which must be compensated by a corresponding displacement of the table 16 along the X-axis, or the Y-axis, or both the X- and the Y-axes simultaneously.

It will be appreciated that the servo-motor 38 is mounted on a non-vertical end surface 42 of the lower support arm 22. Similarly, the servo-motor 40 is mounted on a non-vertical side surface 44 of the upper support arm 24. The inclination of the surfaces 42 and 44 relative to the vertical is such that the active portion of the V-groove 30 of the support and guide members 26 and 28, respectively, is substantially vertical, such active portion of the V-groove being the portion of the helical groove whose sidewall surfaces are in engagement with a portion of the peripheral surface of the wire electrode 12.

Figure 3A:
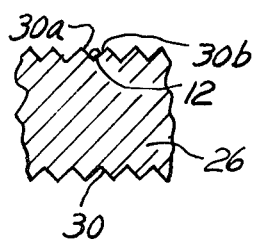
FIG. 3a is a partial section along line 3a—3a of FIG. 2.
Figure 2:
FIG. 2 is a schematic illustration in section of a mechanism according to the present invention which further permits electric current to be simultaneously supplied to an electrode wire, generally along line 2—2 of FIG. 1.
Figure 3:
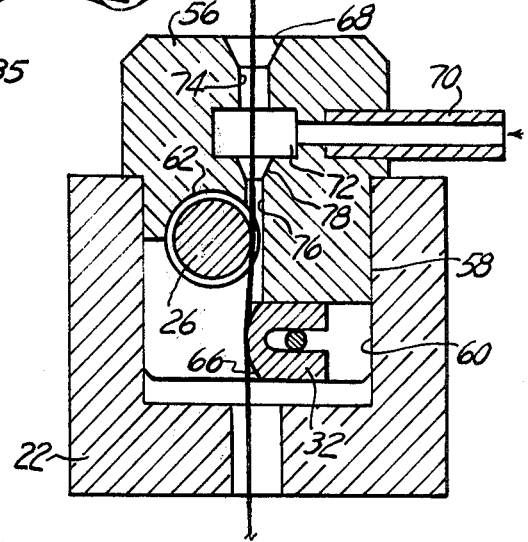
FIG. 3 is a transverse section along line 3—3 of FIG. 2.

It will be appreciated that the contacts 32 and 34 supplying electrical current to the electrode wire 12, if made simply of current-conductive cylindrical members, would be subject to rapid wear as a result of having a portion of their peripheral surfaces in constant frictional engagement with the rapidly moving electrodes wire, made preferably of copper, bronze or other current-conductive metal or alloy, with the result that grooves will be formed on the surface of the contact members which will prevent free lateral displacement of the electrode wire, as the electrode wire will tend to remain caught at the bottom of the groove. FIGS. 2-3 illustrate in more detail an example of structure according to the present invention, as mounted on the end of the lower support arm 22, for instance. The servo-motor 38 is mounted on the inclined end surface 42 of the support arm 22, and has an output shaft 46 driving through a coupling 48 the helically grooved rotatable electrode wire support and guide member 26. For that purpose, the helically grooved member 26 has a stub shaft 50 formed integrally on one end thereof and supported by a convenient bearing means, such as ball bearing 52, inside a cylindrical bore 54 formed in the end of the support arm 22, and through which projects the output shaft 46 of the servo-motor 38 and the coupling 48 connecting the motor output shaft 46 to the support and guide member stub shaft 50. A movable carriage 56 is slidably mounted on top of the support arm 22 and has a portion 58 projecting within a recess 60 formed in the support arm 22. The lower portion 58 of the carriage 56 has a bore 62 provided with an internal thread 64 of the same dimension and same lead as the helical groove 30 on the rotatable support and guide member 26, with the result that when the electrode wire support and guide member 26 is rotated by the servo-motor 38, the carriage 56 is linearly displaced, by the member helical groove 30 engaged in the threaded bore 62 of the carriage, simultaneously with the electrode wire 12 engaged at the bottom of a portion of the helical groove 30. The electric contact member 32 takes the form of a block of electrically conductive hard metal or alloy, such as tungsten carbide for example, electrically connected by an appropriate conductor, not shown, to a terminal of the pulse generator. The block of electrically conductive metal or alloy forming the contact 32 is provided with a partially cylindrical face 66 which engages the wire 12 and deflects it in an appropriate direction, as best shown at FIG. 3, that causes the wire to engage the bottom of a portion of the helical groove 30 on the support and guide member 26, engaged with and between opposite sidewalls surfaces 30a and 30b of the helical groove 30, FIG. 3a.

In this manner, the partially cylindrical surface 66 of the electrical contact 32 may be subjected to a certain amount of wear, as a result of frictional engagement with the electrode wire 12, which eventually may result in cutting groove on the face 66 of the electrical contact 32, without interfering with the displacement or deflection of the electrode wire 12 during travel from one end to the other of the helically grooved support and guide member 26, in view of the fact that the electrical contact 32 is displaced by the carriage 56 in unison with the corresponding displacement of the electrode wire 12. Another advantage presented by the structure of FIGS. 2-3, consists in providing a nozzle 68 to which dielectric fluid is supplied from a tubular fitting 70, to which is connected a flexible hose, not shown, via a horizontal passageway 72 and a vertical passageway 84 disposed through the mass of the carriage 56 coaxially to the electrode wire 12. The passageway 74 and the nozzle 68 remain substantially coaxial with the electrode wire 12 as it travels along the wire support and guide member 26, as the carriage 56 also travels in synchronism with the linear travel of the wire. A small diameter channel 76 is disposed in the carriage 56 to enable the electrode wire 12 to pass vertically through the carriage. In view of the difference in diameter between the small diameter channel 76 and the much larger diameter passageway 74, the majority of the dielectric fluid flow is effected through the nozzle 68 toward the machining zone between the electrode wire and the workpiece.

In traveling wire EDM apparatus wherein the electrode wire is longitudinally displaced from the top to the bottom of the workpiece, which is generally the case, the nozzle 68 is preferably formed, as shown at FIG. 2, in the form of a funnel or a cone with downwardly converging wall. A funnel-shaped inlet 78 is disposed between the passageway 72 and the narrow channel 76 such as to facilitate threading of the electrode wire 12 through the carriage 56, the upper portion of the narrow channel 76 leading directly to the bottom of the helical groove 30 in the support and guide member 26.

Although the carriage 56 represents a movable part, it is to be noted that it need not be manufactured with high precision, and that the carriage 56 may even be made of a hard plastic molding, with very little machining required for proper fit partly in the cavity 60 and on the end of the support arm 22.

The combination of the upper electrode wire support and guide member 28 and upper electrical contact member 34, both mounted on the end of the upper support arm 24, can be made of the same structure as hereinbefore described, and it will be apparent to those skilled in the art that a repetition of the description is not necessary for proper understanding of the invention.

Figure 4:
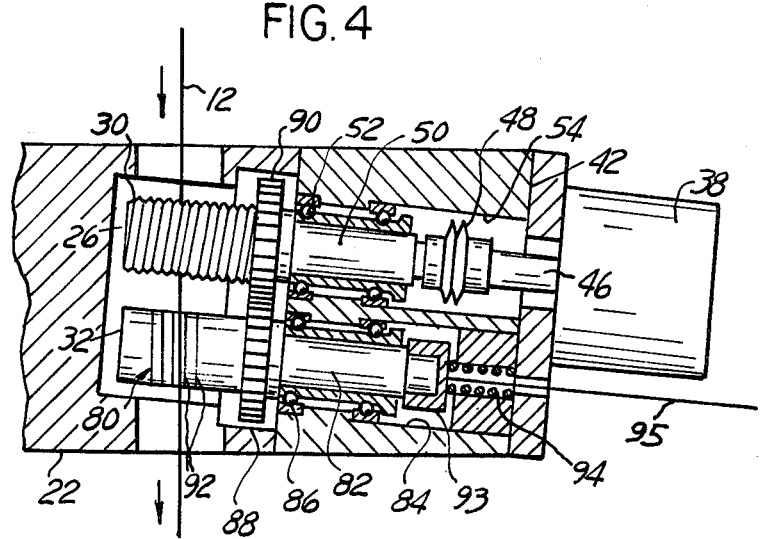
FIG. 4 is a modification of the structure of FIGS. 2-3.

A modification of structure, still according to the present invention, is illustrated at FIG. 4. In the structure of FIG. 4, the helically grooved support and guide member 26 mounted on the end of the support arm 22 is driven in rotation by the servo-motor 38 generally in the same manner as in the structure hereinbefore disclosed and illustrated at FIGS. 2 and 3. The electrical contact 32 is in the form of a cylindrical member 80 having a stub shaft 82 on one end thereof which is supported for rotation relative to a bore 84 by an appropriate bearing structure such as ball bearings 86. The cylindrical contact member 32 has an integral or keyed-on toothed wheel 88 meshing with an identical, in diameter and number of teeth, toothed wheel 90 formed integral with or keyed between the wire helically grooved support and guide member 26 and its stub shaft 50. In this manner, the contact cylindrical member 80 is caused to be driven in rotation in a direction opposite to that of the rotating support and guide member 26 when driven by the servo-motor 38. Any wear resulting from the rubbing action of the electrode wire 12 in engagement with the peripheral surface of the cylindrical member 80 forming the contact 32 results in cutting on the peripheral surface of the cylindrical member 80 an helical groove of the same lead as the helical groove 30 of the support and guide member 26, as shown at 92, but in an opposite direction as compared to the helical groove 30 on the support and guide member 26. In this manner, the helical groove 92 peripherally formed on the peripheral surface of the cylindrical member 80 permits displacement of the electrode wire 12 on a path parallel to the longitudinal axis of the electrical contact cylindrical member 80 in the same direction and to the same distance as the displacement of the electrode wire 12 caused by engagement with the bottom of the helical groove 30 on the peripheral surface of the support and guide member 26. Electrical current is brought to the contact 32 by means of a rotary contact 93 engaging the end of the stub shaft 82 and urged by a spring 94 in current-conductive engagement with the end of the stub shaft, a conductor 95 being connected to the rotary contact 93.

Both FIGS. 2 and 4 illustrate clearly the inclination of the axis of the rotatable support and guide member 26, such that the helical groove 30, at the bottom of a portion of which the electrode wire 12 is engaged, is disposed substantially along a vertical axis.

Figure 5:
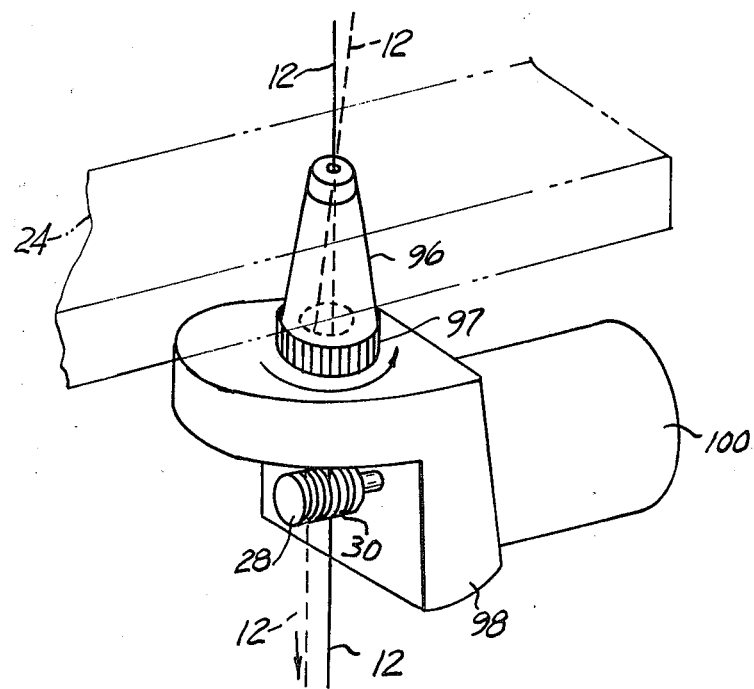
FIG. 5 is a schematic illustration of the present invention wherein inclination of the electrode wire is controlled according to polar coordinates.

FIG. 5 illustrates, in a schematic manner and in perspective, an arrangement for inclining an electrode wire 12 relative to a workpiece, which, in addition of being capable of being controlled according to Cartesian coordinates, can also be controlled according to polar coordinates. The upper support arm 24, for example, carries a servo-motor, not shown, which, through a gear 97, drives in rotation, along the vertical axis, a bracket 98 mounted on the support arm 24 by means of a tubular conical member 96 fitted in a corresponding conical bore in the support arm 24. The bracket 98 supports the electrode wire helically grooved support and guide member 28, driven in rotation around a horizontal axis by a servo-motor 100. The assembly is the equivalent of one consisting of inclining the electrode wire by displacing a conventional electrode wire support and guide member eccentrically along a radial slide. As the lower support arm is provided with a stationary electrode wire support and guide member, the EDM apparatus is thus provided with a single helically grooved support and guide member for the electrode wire which allows the electrode wire to be inclined in all directions with a minimum of accurately made moving parts.

The invention can also be used with advantages on an EDM apparatus provided with a plurality of parallel electrode wires. Each of the electrode wires is supported and guided by one of the bottom portions of the helical groove on the support and guide member, and by rotating the helically grooved support and guide member, all the electrode wires are displaced simultaneously with a very high accuracy.

Having thus described the present invention by way of examples of structure thereof, particularly adapted to fulfill the objects of the invention, modifications whereof will be apparent to those skilled in the art, what is claimed as new is as follows:

1. An improvement for an EDM apparatus wherein a cut is effected by electrical discharges in a workpiece by means of an electrode tool in the form of an electrically-conductive wire, said apparatus comprising a pair of wire guide and support members each mounted at the end of each of a pair of support arms one disposed on one side and the other on the other side of a machining zone between said workpiece and said wire whereby said wire has a longitudinal axis disposed at an angle relative to said workpiece, and a pair of servo-motors for displacing said pair of support arms and said workpiece relative to each other according to a predetermined path, said improvement comprising at least one of the electrode wire support and guide members being in the form of a rotatable cylindrical member, a helical groove on the peripheral surface of said cylindrical member, said helical groove having a bottom and sidewall surfaces, and a motor for driving said cylindrical member in rotation, whereby said wire is supported and guided by a portion of the surfaces of said helical groove and the angle of said wire relative to said workpiece is varied as a function of the rotation of said cylindrical member having said helical groove on the peripheral surface thereof.

2. The improvement of claim 1 wherein said helically grooved cylindrical member is made of sapphire.

3. The improvement of claim 1 wherein said rotatable cylindrical member is coupled directly to said motor.

4. The improvement of claim 1 further comprising a bearing surface for said wire deflecting said wire into engagement at the bottom of said helical groove with portions of the sidewall surfaces of said helical groove.

5. The improvement of claim 4 wherein said bearing surface is current-conductive and defines a sliding contact for supplying electrical current to said wire.

6. The improvement of claim 4 wherein said bearing surface is longitudinally displaced in unison with the displacement of said wire such that said wire is constantly in engagement with said bearing surface at a predetermined area thereof.

7. The improvement of claim 5 wherein said bearing surface is longitudinally displaced in unison with the displacement of said wire such that said wire is constantly in engagement with said bearing surface at a predetermined area thereof.

8. The improvement of claim 6 wherein said bearing surface is mounted on a linearly movable carriage, and said carriage has a nozzle for introduction of machining fluid into said machining zone.

9. The improvement of claim 8 wherein said wire is disposed substantially coaxially in said nozzle.

10. The improvement of claim 7 wherein said bearing surface is mounted on a linearly movable carriage, and said carriage has a nozzle for introduction of machining fluid into said machining zone.

11. The improvement of claim 9 wherein said wire is disposed substantially coaxially in said nozzle.

12. The improvement of claim 6 wherein said bearing surface is the surface of a cylindrical member having its longitudinal axis parallel to said helically grooved cylindrical member, said cylindrical member being driven in rotation in unison with said helically grooved cylindrical member.

13. The improvement of claim 1 wherein said helically grooved cylindrical member has its longitudinal axis disposed at an appropriate angle to the longitudinal axis of said electrode wire such that a portion of said helical groove engaged by said electrode wire is oriented substantially parallel to said wire.

* * * * *